United States Patent
Ream

[11] Patent Number: 5,268,554
[45] Date of Patent: Dec. 7, 1993

[54] APPARATUS AND SYSTEM FOR POSITIONING A LASER BEAM

[75] Inventor: Stanley L. Ream, Charlottesville, Va.

[73] Assignee: General Electric Co., New York, N.Y.

[21] Appl. No.: 906,600

[22] Filed: Jun. 29, 1992

[51] Int. Cl.⁵ .............................................. B23K 26/08
[52] U.S. Cl. .............................. 219/121.8; 219/121.78; 219/121.74
[58] Field of Search ........... 219/121.8, 121.68, 121.69, 219/121.73, 121.74, 121.78, 121.79

[56] References Cited

U.S. PATENT DOCUMENTS

| | | | |
|---|---|---|---|
| 3,514,776 | 5/1968 | Mulready | 219/121.74 X |
| 4,659,900 | 4/1987 | Gilli et al. | 219/121 LG |
| 4,762,994 | 8/1988 | Byerly et al. | 250/236 |
| 5,011,282 | 4/1991 | Ream et al. | 356/153 |
| 5,067,086 | 11/1991 | Yamazaki et al. | 364/474.08 |

Primary Examiner—C. L. Albritton
Attorney, Agent, or Firm—Richard A. Menelly

[57] ABSTRACT

An apparatus for controlling a high power laser beam for three dimensional operation consists of a mirror and three linear servo-mechanisms to tilt and to translate the mirror. The movement of the linear servo-mechanisms is controlled by a computer numerical control system or programmable logic controller.

23 Claims, 4 Drawing Sheets

APPARATUS AND SYSTEM FOR POSITIONING A LASER BEAM

BACKGROUND OF THE INVENTION

This invention relates to the manipulation of laser beams for the purpose of materials processing. The laser materials processing techniques that may be performed with this invention include heating, drilling, cutting, cleaning, marking, engraving, welding, transformation hardening, cladding, curing, paint stripping stereolithography, and the general class of laser surface modifications. Each of these laser processes requires that a focused or otherwise shaped laser beam be positioned and/or translated relative to a work surface.

Some laser processes require the laser beam to be stationary with respect to the work surface during processing. In other processes the laser beam is required to travel smoothly along a programmed path on a work surface. Laser cutting is the most common example of this traveling interaction of laser beam and work surface.

The relative motion of laser beam and work surface can be accomplished in a variety of ways depending upon machine floor space, weight, accuracy, ease of work loading, ease of beam alignment, speed of motion, and acceleration along the programmed path.

In high speed laser cutting processes, higher laser power yields higher cutting speed, which cutting speed, in turn, is inversely proportional to the work material thickness. In most laser cutting operations, the cutting speed is limited more by quality and economics than by the ability to manipulate the laser beam along the desired path. In the laser cutting of thin materials, such as cloth or paper, the processing speeds can be very high without sacrificing quality. With thin materials, the laser processing speed is usually limited by mechanical constraints rather than the availability of laser power.

In the so-called "flying optics" approach wherein the laser system is mobile in relation to a stationary work product, the laser beam manipulation offers the fastest travel speed and acceleration. The moving mass of such systems is low since the work holding elements are stationary.

Although the mass of the components within the above systems can be minimized with careful design and advanced materials, the fact that these components must travel along a programmed path rather than a straight path limits higher acceleration and thus limits the average processing speed.

If the laser beam alone can be manipulated along the programmed path, without the limitations of the associated mechanical mass, the lateral acceleration along the path can be increased. "Galvanometer-type" mirror systems such as described within U.S. Pat. No. 4,762,994, entitled "Compact Optical Scanner Driven by a Resonant Galvanometer", for example, are capable of efficient operation at limited laser power. Such systems are typically limited to a laser beam diameter of a few inches, and the beam diameter at the scanning mirror is not large. Galvanometers are not commercially available for manipulating the large diameter laser beams that are required for scanning large surface areas with high power laser beams.

It would be economically advantageous to provide a large diameter laser beam to result in increased laser power directed upon the work surface. The use of the galvanometer-type optical scanner described earlier, requires small-sized mirrors that are incapable of providing such laser beams of increased beam diameter.

Accordingly, it is one purpose of the invention to provide a high power laser system, for focusing and rapidly manipulating a beam focal spot, utilizing larger diameter laser beams and larger mirrors without requiring galvanometer scanners for moving the laser beam relative to the work surface.

SUMMARY OF THE INVENTION

The invention comprises a three dimensional laser beam focal point manipulation or scanning apparatus, suitable for materials processing, consisting of a high power laser beam traversing a non-linear path with maximum acceleration. A large reflecting mirror is arranged on a computer controlled flexible drive system for directing a high density laser beam onto a work surface.

DESCRIPTION OF THE PREFERRED EMBODIMENT

Figure 1:
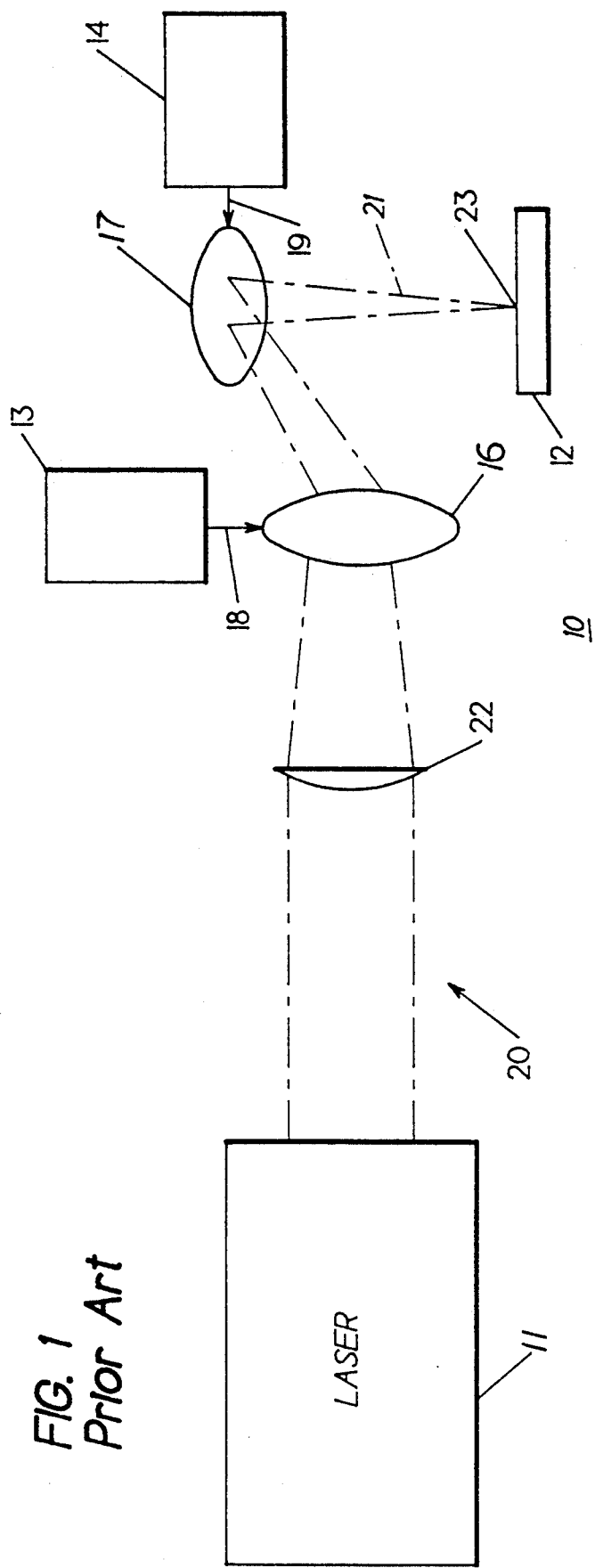
FIG. 1 is a side view of a high speed laser focal point scanning system according to the prior art.

Before describing the high power laser according to the invention, it is helpful to review a known laser system 10 such as shown in FIG. 1 which contains an industrial laser 11 similar to that described within aforementioned U.S. Pat. No. 4,762,994. A pair of galvanometers 13, 14 are operably connected with a pair of mirrors 16, 17 by means of flexible connectors 18, 19. In operation, the laser beam 20 is directed through a converging lens 22 to mirror 16 arranged in the vertical plane, as viewed in FIG. 1, and then to mirror 17 which is arranged in the horizontal plane. The converging beam 21 is then focused to a point 23 upon the surface of material 12 which could comprise a cloth fabric for controlled cutting of the fabric material. A further example of a precisely-controlled laser cutting machine is found within U.S. Pat. No. 4,659,900 entitled "Laser Cutting Machine".

Figure 2:
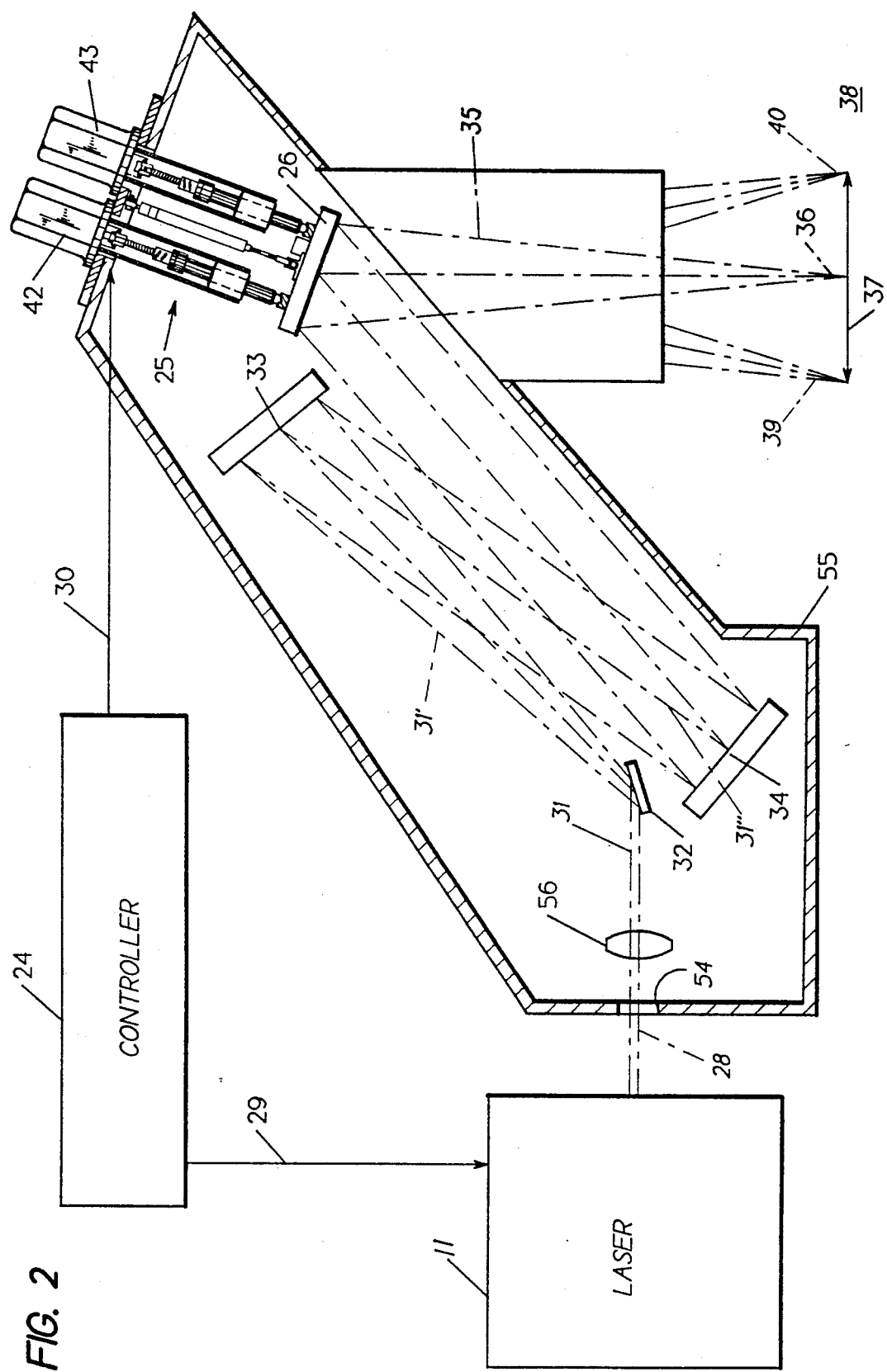
FIG. 2 is a side view of a high power and high speed laser system according to the invention.

The high speed, high power laser system 38, according to the invention, is best seen by now referring to FIG. 2 wherein a similar but higher power industrial laser 11 is operably connected by means of a flexible connector 29 with a controller 24, which for purposes of example, could comprise a computerized numerical controller (cnc) or a programmable logic controller (plc) for a full range of control functions. The controller, in turn connects with a scanner assembly 25 and servomotors 42,43 by means of a separate flexible connector 30 to control the orientation of the large reflecting mirror which serves as the scanning mirror 26. In operation the laser beam 28 passes through an opening 54 in the support housing 55 and then through a negative (diverging) spherical lens 56. The cylindrically corrected, diverging beam 31 is reflected at a 45 degree angle by a first flat mirror 32. In an alternate embodiment, this mirror may be a phase retarding mirror which imparts circular polarization to a linearly polarized incoming beam. The continually diverging beam 31' is reflected by a second flat mirror 33 to a large spherical or parabolic mirror 34. The curvature of mirror 34, lens 56, their separation distances and the angle of incidence of the diverging beam 31", with respect to the optical axis of mirror 34 are designed such that the converging beam 35 will reach a focal point 36 that is corrected for astigmatism. The position of the focal point 36 on the work surface 37 is determined by the position of the flat scanning mirror 26. As will be described below in greater detail, this laser focal point 36 may be manipulated rapidly to other positions 39, 40 on the work surface, as indicated in phantom, by programmed motion of the scanning mirror 26.

Examples of a cnc-controlled laser arranged to provide three dimensional operation are found within U.S. Pat. No. 5,067,086 and 5,011,282. The speed, acceleration, and area of the laser focal point manipulation described therein are substantially limited by the necessity to translate and rotate the machine masses associated with the X, Y, Z axes of the system. Relative to the other prior art shown in FIG. 1 it is noted that the size of the scanning mirror 26 of the present invention in FIG. 2 can be substantially larger than those described in either prior art reference.

Figure 3:
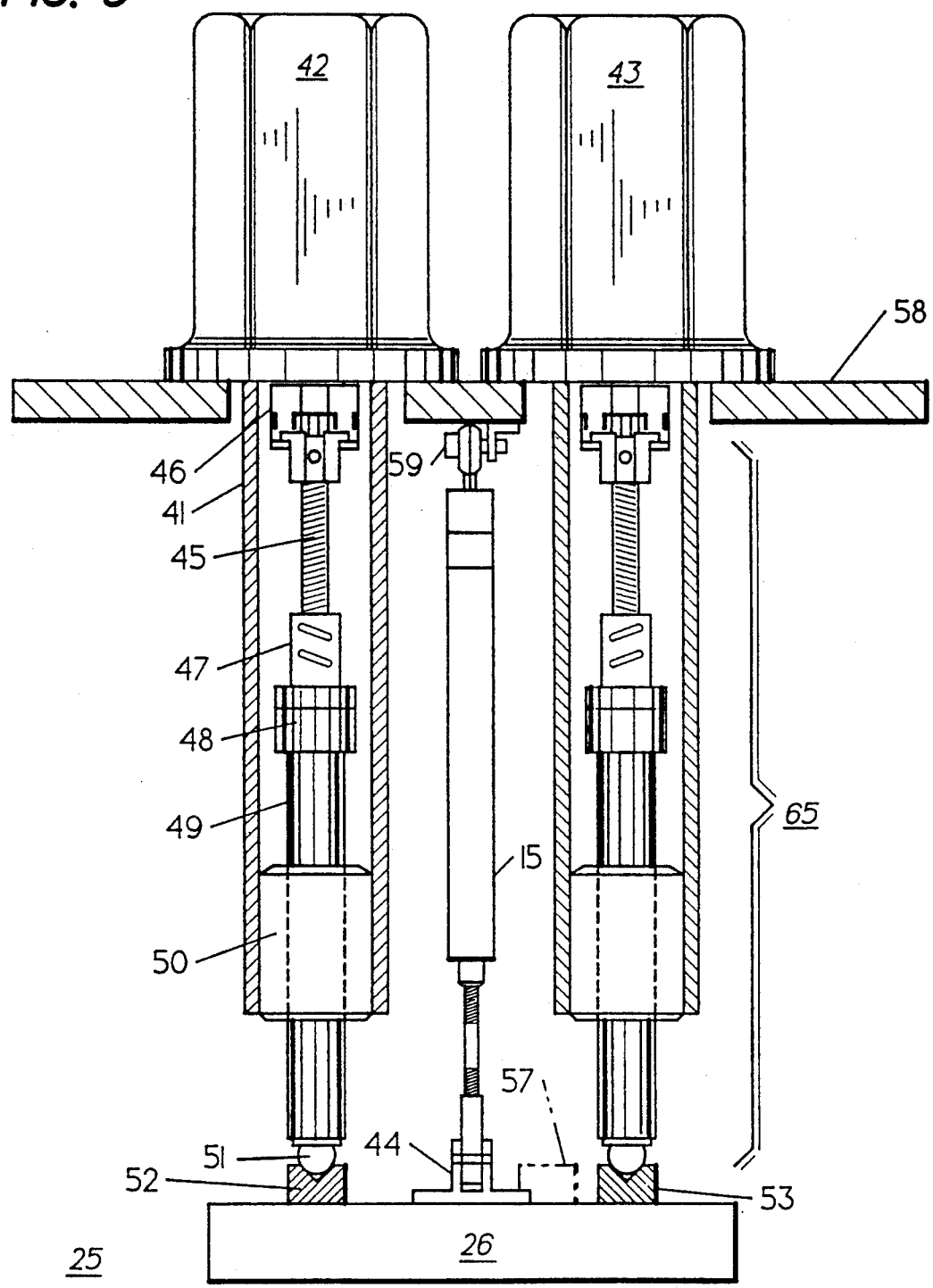
FIG. 3 is an enlarged side view of the scanner assembly within the laser system of FIG. 2.

The three dimensional operation of the scanning mirror 26 is achieved by the flexible drive system 65 within the scanner assembly 25 shown in an enlarged representation in FIG. 3. Although three servomotors are required for full three dimensional manipulation of the focal point, only two 42, 43, are shown herein for purposes of clarity. The servomotors are connected by couplers 46 to corresponding lead screws 45 through a separate support plate 58. The lead screws 45 are connected to nuts 47, which are rigidly attached to couplings 48. The couplings are rigidly attached to one end of an inner spline 49. The inner splines are contained within corresponding outer splines 50, which permit linear translation of the inner splines but do not permit rotation or angular motion of the inner splines about their axes. The outer splines 50 are captured rigidly in support tubes 41, to which the servomotors 42,43 are attached. The opposite ends of the inner splines 49 are attached to hardened tooling balls 51, which rest in mirror locator seats 52, 53. A third locator seat 57 is shown in phantom and connects with a similar inner spline (not shown). Locator seat 52 is provided with a conical impression, locator seat 53 is provided with a grooved impression, and locator seat 57 has a flat surface. Together these three seats, as positioned by the three tooling balls 51, fully define the rotational and lateral position of the scanning mirror 26.

Figure 4:
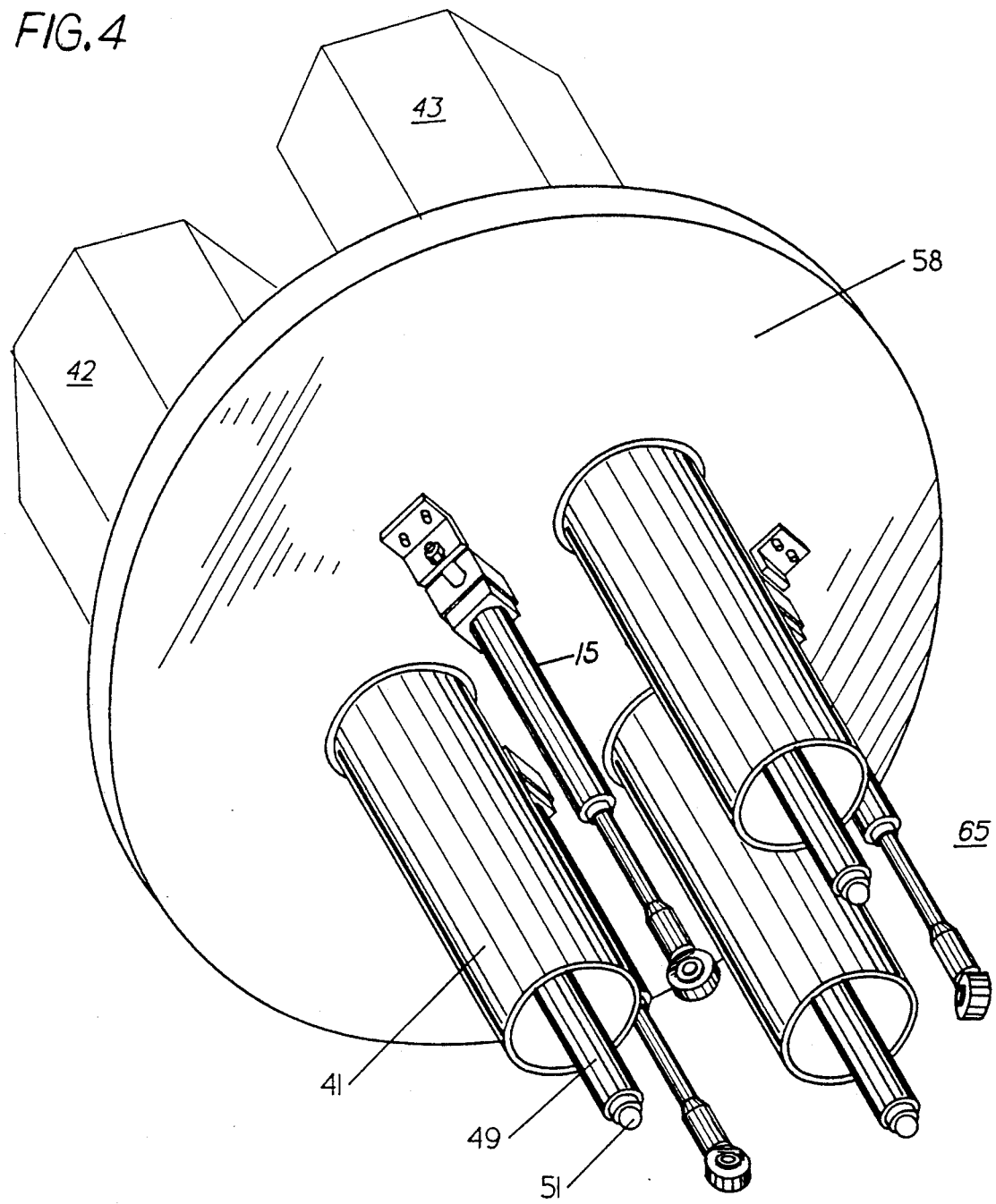
FIG. 4 is a greatly enlarged bottom perspective view of the flexible drive system within the scanner assembly of FIG. 3.

As best seen by referring to FIGS. 2,3 and 4, the scanning mirror 26 is held against the tooling balls 51 by the holding force applied by three pneumatic cylinders 15 which are attached via flexible couplings 44 to one side of the scanning mirror and via coupling 59 to the mounting plate 58 of the scanner assembly 25. Three such pneumatic cylinders are arranged in a circular pattern, interspaced between the support tubes 41 and act as constant force support springs to the scanning mirror 26. Thus, the counter-forces acting on the scanning mirror are effectively balanced and minimized. The effective spring force provided by the cylinders can be optimally controlled by varying the air pressure to the cylinders to counteract the gravitational and inertial forces acting on the scanning mirror during high speed operation.

The servomotors 42,43, are individually rotated by means of the controller 24 according to predetermined position information. Each servomotor acts independently on its associated lead screw 45. When the lead screw rotates, it causes nut 47, coupling 48, inner spline 49 and tooling ball 51 to move in a straight line as defined by the fixed outer spline 50. The outer spline also prohibits any rotation or tilting of the associated inner spline. The force of the pneumatic cylinder 15 acts on the mirror 26 to keep the mirror locator seats 52, 53, 57 in contact with the tooling balls as they translate. The geometries of the mirror locator seats 52,53,57 are configured to provide the minimum non-redundant number of constraints necessary to position the scanning mirror 26. As described earlier, mirror locator seat 52 is conical, mirror locator seat 53 is grooved and mirror locator seat 57 is planar. Accordingly, there is a unique position of the three tooling balls 51 and the three associated servomotors for each position of the laser focal spot 36 on the work surface 37.

A precisely controlled high power industrial laser system utilizing servomotors, a cnc or plc controller, beam delivery optics and a flexible scanner assembly for high speed three dimensional manipulation or a focused laser beam has herein been described. The system of the invention finds particular application in the fabric, automotive and stereolithographic fields.

Having thus described my invention, what I claim as new and desire to secure by letters patent is:

1. Apparatus for scanning a laser beam comprising:
   a laser source;
   a control unit operably connected with said laser source for directing a laser beam onto a first reflector; and
   a scanner operably connected with said control unit and with a second reflector for reflecting a three-dimensional representation of said laser beam onto a work product control unit comprising a computerized numerical controller or a programmable logic controller.

2. The apparatus of claim 1 wherein said first reflector comprises a divergent lens.

3. The apparatus of claim 1 wherein said second reflector comprises a planar mirror.

4. Apparatus for scanning a laser beam comprising:
   a laser source;
   a control unit operably connected with said laser source for directing a laser beam onto a first reflector; and
   a scanner operably connected with said control unit and with a second reflector for reflecting a three-dimensional representation of said laser beam onto a work product, said scanner comprising a plurality of motors connecting with said second reflector by a flexible connection system.

5. The apparatus of claim 4 wherein said flexible connection system includes a flexible coupling interconnecting with a tooling ball.

6. The apparatus of claim 5 wherein said tooling ball is received in a locator seat attached to one side of said second reflector.

7. The apparatus of claim 6 wherein said locator seat defines a predetermined tooling ball receiving surface, said tooling ball receiving surface defining a corresponding displacement of said second mirror.

8. The apparatus of claim 6 herein said tooling ball receiving surface is planar.

9. The apparatus of claim 6 wherein said tooling ball receiving surface is conical.

10. The apparatus of claim 6 wherein said tooling ball receiving surface is grooved.

11. The apparatus of claim 4 wherein said flexible connection system includes a lead screw.

12. The apparatus of claim 11 including a nut and a coupling connecting between said tooling ball and said lead screw translating rotary motion from said lead screw to translatory motion applied second reflector.

13. The apparatus of claim 4 including a pneumatic cylinder interconnecting be ween said motors and said second reflector, said pneumatic cylinder providing holding force to said second reflector.

14. Apparatus for scanning a laser beam comprising:
   a laser source;
   a control unit operably connected with said laser source for directing a laser beam onto a first reflector;
   a scanner operably connected with said control unit and with a second reflector for reflecting a three-dimensional representation of said laser beam onto a work product; and
   a third and a fourth reflector intermediate said first and said second reflectors said third reflector receiving said laser beam from said first reflector and reflecting said laser beam to said fourth reflector.

15. The apparatus of claim 1 wherein said first and said second reflectors comprise planar mirrors.

16. The apparatus of claim 14 wherein said third reflector comprises a planar mirror and said fourth reflector comprises a spherical or parabolic mirror.

17. The apparatus of claim 14 wherein said fourth mirror reflects said laser beam to said second mirror.

18. The apparatus of claim 14 wherein said first and second reflectors comprise planar mirrors.

19. A method of providing three dimensional operation to a laser comprising the steps of:
   providing a beam of laser light from a source;
   reflecting said beam from a first reflector to a second reflector;
   attaching a flexible drive system to said second reflector;
   operably connecting a controller intermediate said second reflector and said source;
   selectively moving said second reflector to produce a three dimensional manipulation of said beam; and
   interposing a plurality of tooling balls between said second reflector and said flexible drive system.

20. The method of claim 19 including the steps of:
   providing plurality of motors within said scanner; and
   connecting said motors to a corresponding plurality of lead screws via a corresponding plurality of rigid couplings.

21. The method of claim 19 including the step of interposing a conical surface intermediate one said tooling balls and said second reflector.

22. The method of claim 19 including the step of interposing a grooved surface intermediate one of said tooling balls and said second reflector.

23. The method of claim 19 including the step of interposing a planar surface intermediate one of said tooling balls and said second reflector.

* * * * *